United States Patent [19]

Murasaki et al.

[11] Patent Number: 4,622,628

[45] Date of Patent: Nov. 11, 1986

[54] PWM INVERTER APPARATUS WITH DIGITAL CONTROL

[75] Inventors: Shigeru Murasaki, Narashino; Motonobu Hattori, Funabashi; Akira Ishibashi, Tokyo; Kenji Nandoh, Matsudo, all of Japan

[73] Assignee: Hitachi, Ltd., Tokyo, Japan

[21] Appl. No.: 623,085

[22] Filed: Jun. 21, 1984

[30] Foreign Application Priority Data

Jun. 22, 1983 [JP] Japan ................................ 58-110882

[51] Int. Cl.$^4$ ......................... H02M 1/12; H02P 5/00
[52] U.S. Cl. ....................................... 363/37; 363/41; 363/97
[58] Field of Search ................... 323/241; 363/37, 39, 363/40, 41, 43, 95, 97, 98; 318/811, 722

[56] References Cited

U.S. PATENT DOCUMENTS

| | | | |
|---|---|---|---|
| 4,099,109 | 7/1978 | Abbondanti | 363/42 |
| 4,287,463 | 9/1981 | Walker et al. | 363/37 |
| 4,480,299 | 10/1984 | Muto et al. | 363/41 |
| 4,500,837 | 2/1985 | Shuey et al. | 363/97 |

FOREIGN PATENT DOCUMENTS

| | | | |
|---|---|---|---|
| 130484 | 1/1985 | European Pat. Off. | 363/37 |
| 53-45158 | 4/1978 | Japan | 363/42 |
| 173376 | 10/1982 | Japan . | |
| 173377 | 10/1982 | Japan . | |

*Primary Examiner*—Peter S. Wong
*Assistant Examiner*—D. Rebsch
*Attorney, Agent, or Firm*—Antonelli, Terry & Wands

[57] ABSTRACT

An inverter for converting DC power to AC power, an oscillation control circuit for stepwise generating a command value concerning the conversion condition of the inverter, and an operation controller which, when the command value from the oscillation control circuit changes, controls the oscillation control circuit to repetitively generate alternate new and old or present command values before and after change of the command value. Particularly, this invention provides an inverter capable of continuing smooth operation even when the control system has a limited resolution.

15 Claims, 5 Drawing Figures

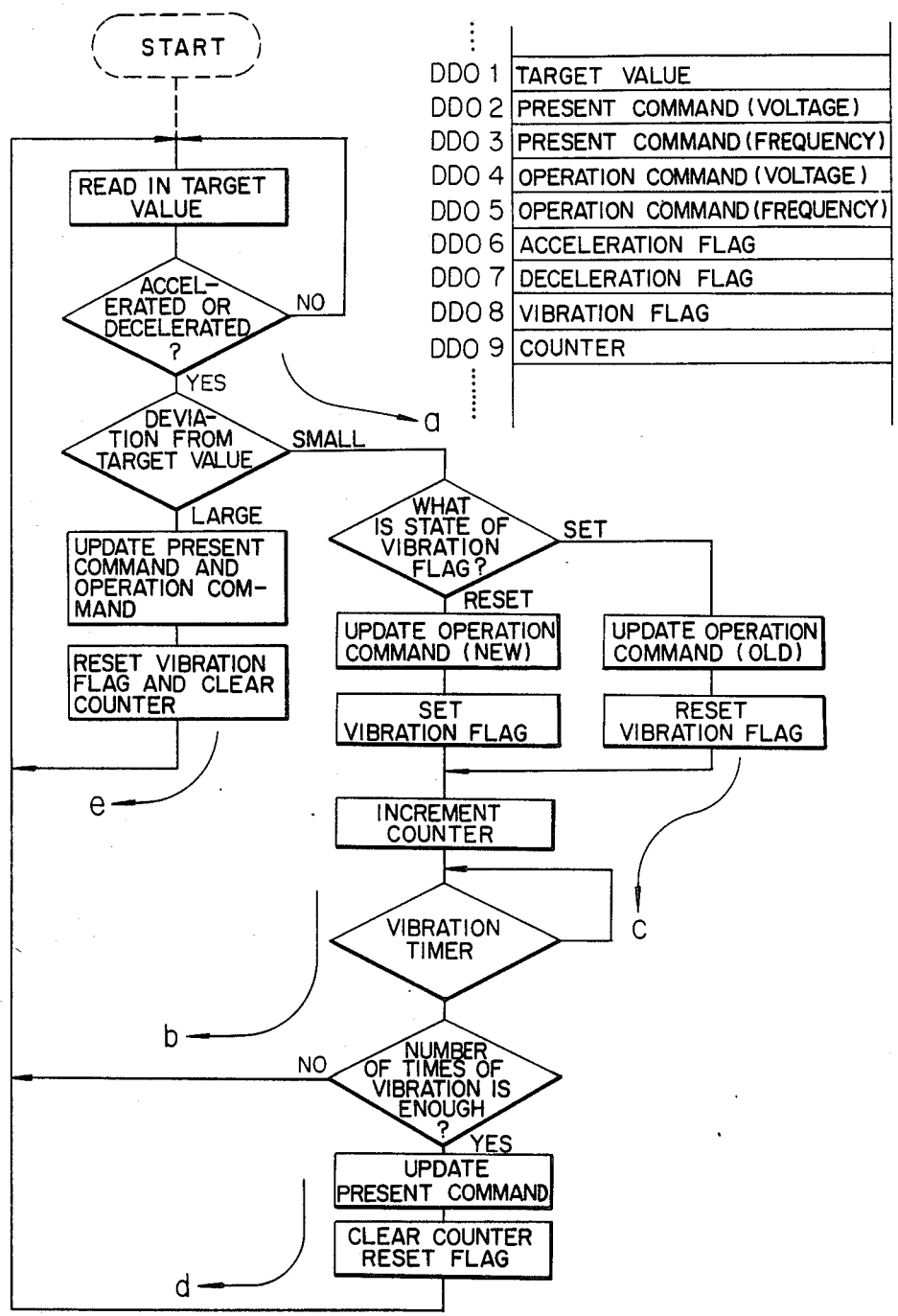

PWM INVERTER APPARATUS WITH DIGITAL CONTROL

This invention relates to inverters, and particularly to an improvement in the operation characteristics of an inverter with digital control unit.

Recently, digitally controlled inverters for converting DC power to AC power have been developed for the purpose of making the circuit construction of an inverter simple and obtaining various different control characteristics. However, in the digital control circuit, the bit length for internal signal processing cannot be increased easily because the increase of bit length will result in high cost. In other words, when the bit length for internal signal processing is limited, each control signal changes stepwise in a certain resolution determined by the bit length, and thus the actual output voltage or output frequency changes stepwise in response to the change of the control signal in spite of the fact that the target value is desired to be controlled continuously by a control signal. When the output voltage or output frequency is changed stepwise, the noise generated from the inverter or motor connected thereto directly, changes stepwise (or gradationally). The stepwise change of sound will be generally offensive and unpleasant, as compared with a continuous change of sound.

Accordingly, it is an object of this invention to provide a digitally controlled inverter capable of preventing such offensive noise from occurring, without increasing the bit length for the internal processing.

According to this invention, there is provided an inverter for converting DC power to AC power and operation control means for controlling said inverter to repetitively generate a plurality of times the command values before and after a change of the command value when the command value concerning the oscillation conditions, such as the output voltage or output frequency of the inverter, is changed stepwise according to the resolution of the digital control system, whereby offensive noise is prevented from occuring.

The invention will become more readily understood from the following exemplary description taken with the accompanying drawings, wherein:

FIG. 2 is a flow chart to which reference is made in explaining the operation of the embodiment;

FIG. 3 shows a part of the memory map in this embodiment;

Figure 1:
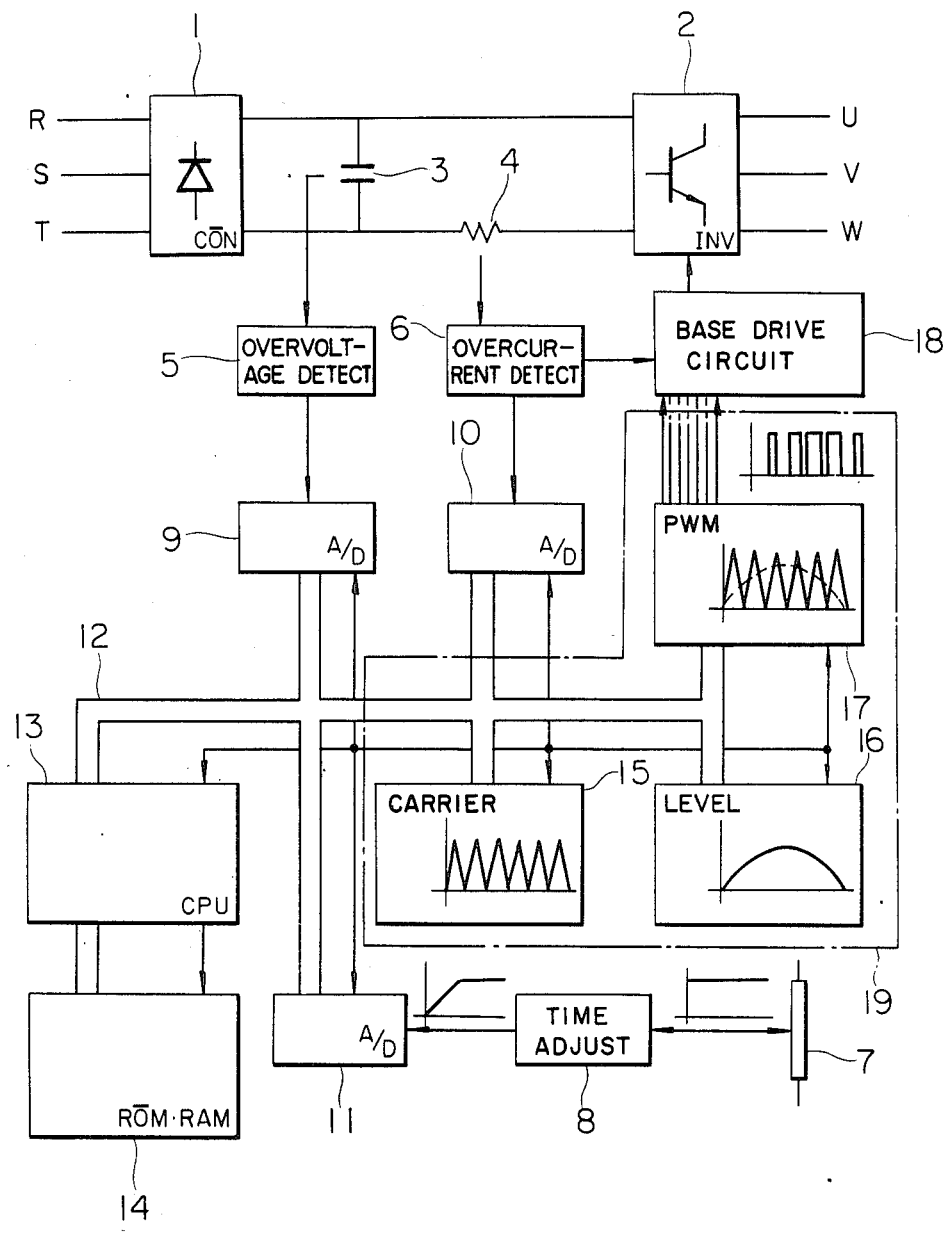
FIG. 1 is a block diagram of one embodiment of this invention.

One embodiment of this invention will hereinafter be described with reference to FIGS. 1 and 4. FIG. 1 is a block diagram of one embodiment of an inverter according to this invention.

Referring to FIG. 1, there are shown a converter portion 1 for converting three-phase AC power R,S and T to DC power, an inverter (hereinafter referred to simply as inverter portion 2) for converting the DC power supplied through a smoothing capacitor 3 again to AC power, a DC detecting resistor 4 connected in the DC power supply circuit, an overvoltage detecting circuit 5 for detecting the overvoltage across the smoothing capacitor 3, an overcurrent detecting circuit 6 for detecting the overcurrent in the DC power supply circuit, a speed selector 7 for setting an inverter to an operating speed (output frequency), and an acceleration/deceleration time adjusting circuit 8 for gradually increasing or decreasing a target value selected by the speed selector 7 in accordance with the amount of inertia of a motor or a load connected to the motor. Also, there are shown A/D (analog-to-digital) converters 9, 10 and 11 for converting analog values such as an overvoltage detected signal, overcurrent detected signal and target value of operation speed, to digital values suitable for a data bus 12, a central processing unit 13 (hereinafter abbreviated CPU) for carrying out various arithmetic processes in accordance with a program stored in a memory 14, a carrier generating circuit 15, a level determining circuit 16 and a pulse-width modulation signal synthesizing circuit 17. These circuits 15, 16 and 17 are shown for convenience of explaining the signal processing modes, and they are actually formed as data of variables processed by the CPU 13 according to the program stored in the memory 14. That is, the carrier generating circuit 15 (more precisely, carrier producing program) calculates instantaneous data of approximate triangle wave shape (triangle wave of stepwise form) of a repetition period according to the target value from the A/D converter 11. The level determining circuit 16 (more precisely, level determining program) reads a voltage value corresponding to the target value supplied through the A/D converter 11, from the voltage-frequency table (V-F table) previously stored in the memory 14 and calculates instantaneous data of approximate sine wave shape (sine wave of stepwise form) having a period corresponding to the target value and an amplitude corresponding to the read voltage value. The pulse-width modulated signal generating circuit (pulse-width modulated signal producing program) receives instantaneous values calculated at the carrier wave generating circuit 15 and at the level determining circuit 16 and calculates a base signal to, for example, a transistor constituting the inverter portion 2 when the instantaneous value from the carrier generating circuit 15 is smaller than that from the level determining circuit 16. Although a wave form signal of a half-wave of one-phase is shown, three-phase full-waves, or 6 different signals are of course formed. Shown at 18 is a base drive circuit which reads the calculated result from the pulse-width modulated signal producing circuit 17 and amplifies it into a base signal to a transistor group constituting the inverter portion 2. The detected signal from the overcurrent detecting circuit 6 is applied directly to the base drive circuit 18, and when an overcurrent is detected, it immediately stops the base signal from being produced before the processing of the CPU 13.

The oscillation command circuit 19 to control the inverter portion 2 can be formed by programs, custom LSI or other digital or analog circuits, as is already well known.

In this embodiment, the operation control means including CPU 13 has the following feature. As shown in FIG. 4, when a target value exceeds the minimum resolution in the control system (the change of the output signal from the A/D converter 11 can be identified), new and old or present command values are alternately repeated several times within a short time, and then a new command value is continuously produced. In order to obtain such control characteristic, in this embodiment the program as shown in FIG. 2 is provided in the memory 14 and the area of variable data as shown in FIG. 3 is provided in the memory 14. More specifically, the program shown by the flow chart of FIG. 2 is executed at intervals of constant time (in a time sharing manner). First, a target value of operation speed is read in through the A/D converter 11. The target value thus sampled is stored at, for example, DD01 address shown in FIG. 3, and then compared with the present command value (corresponding to the command speed or oscillation frequency stored at DD03) which is used as a reference for the operation command value produced at present. If the target value and the present command value are equal (variation of the target value has not reached the minimum resolution of the A/D converter 11), a speed changing operation is not effected. If the target value is determined to be increasing from the comparison of both, the acceleration flag at address DD06 is set. If on the contrary, the target value is determined to be decreasing, the deceleration flag at address DD07 is set. Then, if the difference value between the command and target value is in a range in which the present command value can be changed to reach to the target value by incrementing or decrementing the current command value by 1 bit, the program goes in the arrow a direction as shown in FIG. 2. After the program progresses to the side a, reference is made to the vibration flag at address DD08. If this flag is not set, at the next step reference is made to the acceleration flag and deceleration flag. If the acceleration flag is set, the current command value at address DD03 is incremented once, and newly stored as the operation command (command speed or a value corresponding to the oscillation frequency of the inverter portion 2) at address DD05. On the other hand, if the deceleration flag is set, the current command value at address DD03 is decremented once, and stored as the operation command value at address DD05. After the operation command value is updated, the vibration flag at address DD08 is set, and the counter at address DD09 is incremented once. Thereafter, the vibration timer process for a time interval of ΔT shown in FIG. 4, in which the operation command value after the updating is continuously produced, is carried out, and reference is made to the contents of the counter at address DD09. If the number of times of vibration is not enough (in this embodiment, less than 4 times) as a result of the reference to the counter contents, the processes along the arrow b in FIG. 2 are executed. Since the current command value at address DD03 is not updated, the program again progresses in the arrow a direction, and reference is again made to the vibration flag. Then, since the vibration flag is set, the program further goes along the arrow c and the current command value at address DD03 is again updated as the operation command value at address DD05. In other words, the operation command value returns to the old operation command value before update. Thereafter, the vibration flag at address DD08 is reset, and the process flow mentioned above is repeated. When such process is repeated four times, the program progresses along the arrow d, and reference is made to the acceleration flag at DD06 and the deceleration flag at address DD07. If the acceleration flag is set, the current command value at address DD03 is incremented once, and newly stored as the current command value. On the contrary, if the deceleration flag is set, the current command value at address DD03 is decremented once, and stored at the same address as a new current command value. After update of the current command value, the counter at address DD09 is cleared to zero, and both flags at addresses DD06 and DD07 are reset, the above processing being repeated again.

Figure 4:
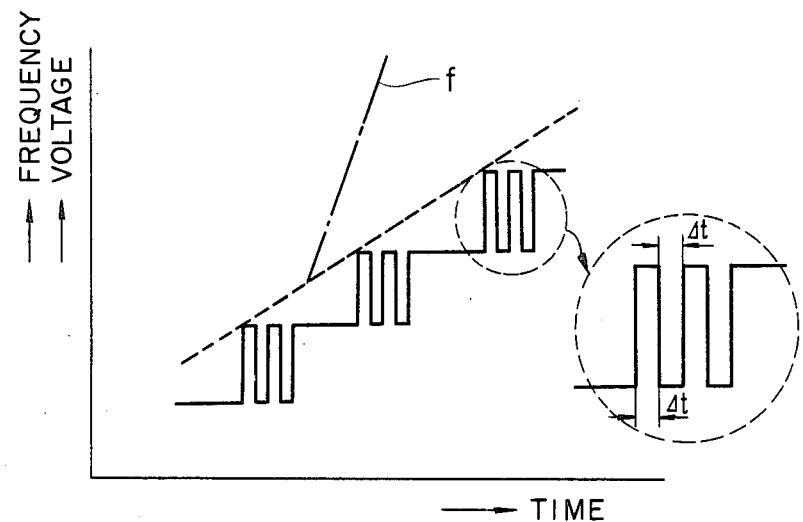
FIG. 4 shows a control characteristic in this embodiment.

If the difference between the target and current command value is large, or if the amount of change of the target value is too large as indicated by f in FIG. 4 to be followed under the processing already mentioned above, the steps on the process flow e are executed. That is, the current command value at address DD03 and the operation command value at address DD05 are immediately updated. In this case, the sampled target value may be directly stored at addresses DD03 and DD05, but when the shock due to deceleration seems to be large, reference is made to the acceleration flag at address DD06 and the deceleration flag at address DD07, and the current command value at address DD03 can be incremented or decremented twice, further incremented or decremented several times, and newly stored as the new current command value and the operation command value. After update of both command values at addresses DD03 and DD05, the flags at addresses DD06, DD07 and DD08 are reset, and the counter at address DD09 is cleared to zero, the processing mentioned above being repeated.

In other words, while the process flow (sub-program) mentioned with reference to FIG. 2 is being executed, another sub-program is executed to read the command values (voltages) corresponding to the command values (frequency) at addresses DD03 and DD05 from the V-F table stored in the memory 14, and store them at addresses DD02 and DD04. Also, still another sub-program is executed to read the operation command value (voltage) at address DD04 and the operation command value (frequency) at address DD05. Then, the carrier producing program, level determining program and pulse-width modulated signal producing program previously mentioned with reference to FIG. 1 are executed on the basis of both the command values, achieving such operation characteristic as shown in FIG. 4.

According to this embodiment, when the command value concerning the oscillation conditions of the inverter portion is changed, the new command value and the old command value are repeated a plurality of times and alternately produced, thereby preventing clear gradational sound (stepwise change of noise) from occurring. Therefore, the inverter of this embodiment can be smoothly operated without causing offensive noise unpleasant conditions in the area of the inverter.

Figure 5:
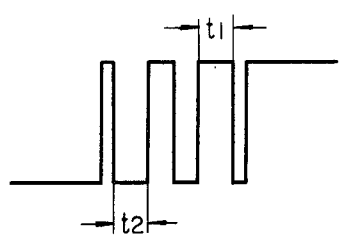
FIG. 5 is a diagram to which reference is made in explaining the control characteristic in another embodiment.

While in the above embodiment both the operation command values for frequency and voltage are simultaneously vibrated, they may be alternately vibrated. Also, as shown in FIG. 5, as the operation of changing the command value progresses, the period t1 in which the command value after change is produced can be gradually increased, or the period t2 in which the command value before change is produced can be gradually decreased. To do this, a table will be provided for storing the contents of the counter and the time at which the vibration timer is set, and the set time in the vibration timer will be changed according to the contents of the counter. According to this invention, it is also possible to perform smooth accelerating and decelerating operations in the inverter.

Moreover, while in this embodiment, areas are provided for storing the current command value and the operation command value, the area for storing the current command value may be omitted if an identifying method is taken so as to identify whether the current command value is a new value or old value on the basis of the state of the vibration flag.

As described above, an inverter according to this invention comprises an inverter for converting DC power to AC power, and operation command means for controlling said inverter to repetitively produce a plurality of times the command values before and after a change of a command value when the command value concerning an oscillation condition of the inverter is changed step by step, whereby the inverter can smoothly perform acceleration and deceleration.

We claim:

1. A PWM inverter apparatus with digital control comprising:
    a variable frequency inverter means for converting DC power to AC power,
    an oscillation control circuit means for controlling stepwise said inverter means in response to a command value,
    memory means for storing a present command value and a new command value, and
    operation control means for controlling said oscillation control circuit means by reading out said present command value and said new command value from said memory means for repetitively alternately applying said present command value and said new command to said oscillation control circuit means so that said command value for said oscillation control circuit means is updated.

2. A PWM inverter apparatus according to claim 1, wherein said operation control means repetitively controls said oscillation control circuit means upon change of said command value to said oscillation control circuit means, said command value corresponding to a minimum value of the resolution of said inverter apparatus.

3. A PWM inverter apparatus according to claim 1, wherein said operation control means controls periods of applying said present command value and said new command value so that the period of said new command value is gradually made longer than the period of said present command value in accordance with the number of repetitions of said present command value and said new command value.

4. A PWM inverter apparatus according to claim 1, wherein said command value determines an output frequency and an output voltage of said inverter apparatus, said memory means stores said present and new command values of said output frequency and output voltage respectively, and said operation control means controls said oscillation control circuit means by reading out said present command values of the output frequency and the output voltage and said new command values of the output frequency and output voltage from said memory means for alternately applying said present command values and said new command values of the output frequency and the output voltage to said oscillation control circuit means so that said command values for said oscillation control circuit means are updated.

5. A PWM inverter apparatus according to claim 1, wherein said command value is an output frequency command value, said memory means stores a present command value and a new command value of the output frequency, and said operation control means controls said oscillation control circuit by reading out said present and new command values of the output frequency from said memory means for alternately applying said present command value and said new command value of the output frequency to said oscillation control circuit means so that said command value for said oscillation control circuit means is updated.

6. A PWM inverter apparatus according to claim 4, wherein said operation control means repetitively controls said oscillation control circuit means upon change of said command values to said oscillation control circuit means, said command values corresponding to a minimum value of the resolution of said inverter apparatus.

7. A PWM inverter apparatus according to claim 5, wherein said operation control means repetitively controls said oscillation control circuit means upon change of said command value to said oscillation control circuit means, said command value corresponding to a minimum value of the resolution of said inverter apparatus.

8. A PWM inverter apparatus according to claim 6, wherein said operation control means further comprises decision means for deciding to update said command values.

9. A PWM inverter apparatus according to claim 7, wherein said operation control means further comprises decision means for deciding to update said command value.

10. A PWM inverter apparatus according to claim 8, said memory means further stores a vibration flag which is set at reading out of said new command values and is reset at reading out of said present command values, and said operation control means reads out said present command values when said vibration flag is set and reads out said new command values when said vibration flag is reset after said decision means decides to update said command values.

11. A PWM inverter apparatus according to claim 9, said memory means further stores a vibration flag which is set at reading out of said new command value and is reset at reading out of said present command value, and said operation control means reads out said present command value when said vibration flag is set and reads out said new command value when said vibration flag is reset after said decision means decides to update said command value.

12. A PWM inverter apparatus according to claim 10, wherein said memory means further stores a predetermined number of repetitions of said present and new command values, and said operation control means repetitively applies said present and new command values to said oscillation control circuit means means until said predetermined number of repetitions is effected.

13. A PWM inverter accordign to claim 11, wherein said memory means further stores a predetermined number of repetitions of said present and new command values, and said operation control means repetitively applies said present and new command values to said oscillation control circuit means until said predetermined number of repetitions is effected.

14. A PWM inverter apparatus according to claim 2, wherein said memory means further stores the changed stage of said command value and a predetermined number of repetitions of said present and new command values.

15. A PWM inverter apparatus according to claim 14, wherein said operation control means repetitively apples said present and new command values to said oscillation control circuit means until said predetermined number of repetitions is effected.

* * * * *